United States Patent [19]

Elenbaas

[11] 4,203,138
[45] May 13, 1980

[54] VIDEO SIGNAL RECORDING SYSTEM WITH DELAYED VERTICAL SYNC

[76] Inventor: William J. Elenbaas, 130 S. Pine St., McBain, Mich. 49657

[21] Appl. No.: 924,798

[22] Filed: Jul. 14, 1978

[51] Int. Cl.² .............................................. H04N 5/78
[52] U.S. Cl. ...................................... 360/37; 360/64; 358/172; 358/150
[58] Field of Search ....................... 360/37, 64, 33, 38; 358/172, 156, 150, 147, 148

[56] References Cited

U.S. PATENT DOCUMENTS

| | | | |
|---|---|---|---|
| 3,488,433 | 1/1970 | Iwai | 360/37 |
| 3,798,364 | 3/1974 | Hayashi | 360/38 |
| 3,845,326 | 10/1974 | Godden | 358/172 |
| 3,995,112 | 11/1976 | Owen | 358/150 |
| 4,120,007 | 10/1978 | Sato | 360/64 |
| 4,121,242 | 10/1978 | Janko | 360/37 |

Primary Examiner—Bernard Konick
Assistant Examiner—Alan Faber
Attorney, Agent, or Firm—Price, Heneveld, Huizenga & Cooper

[57] ABSTRACT

A video recording system for use in recording video information with a helical scan recorder coupled to a portable camera includes a delayed vertical sync generator receiving video information including normal vertical and horizontal synchronization signals from the camera. The delayed sync generator delays vertical synchronization signals with respect to the start of each vertical banking interval such that the head switching point of the helical scanning tape recording apparatus occurs during the vertical blanking interval before the delayed synchronization signals. This eliminates line distortion which otherwise occurs during the video signal information of each scanning frame of the video signal and places it in the vertical blanking interval where it is not displayed as a line distortion in the reproduced video signal on a television screen.

16 Claims, 7 Drawing Figures

VIDEO SIGNAL RECORDING SYSTEM WITH DELAYED VERTICAL SYNC

BACKGROUND OF THE INVENTION

The present invention relates to a system and a method for recording video signals on a helical head recording apparatus.

In conventional magnetic recording systems, a spinning rotary disc includes a plurality of magnetic recording heads at spaced intervals for recording information on lines traversing a magnetic recording tape passing across the rotary disc. Typically, the rotary head spins at approximately 14,400 rpm and has positioned on its periphery four magnetic heads spaced at 90° intervals. Each transverse line is recorded by one head and switching between the heads occurs near an end of each transverse line.

The information recorded on each transverse line of the tape is sufficient for about 16 to 17 horizontal lines of video display. As is known, the interlaced video display includes two fields each with 262.5 horizontal lines such that 16 recorded lines are required to produce each field of the video display. Although this requires switching between magnetic recording heads 16 times, the high quality of the electronics associated with the relatively expensive studio equipment permits switching with relatively imperceptible distortion on the reproduced display. Further, there is sufficient recorded video information on each transverse line so that switching between heads can occur near the end of each line which switching will occur off of the video display of the television receiver. As a result, switching between heads does not produce perceptible visual distortion.

With the introduction of portable equipment typically used for on-site news gathering, small portable cameras are employed with less expensive tape recording machines and the problem of head switching line distortion is prevelant. Typically, the recorder employed with the mini-cams employs a cylindrical recording drum with a pair of spaced magnetic recording heads. Instead of the magnetic recording tape passing parallel to the axis of rotation of the drum, the tape is passed around the periphery of the drum at a small angle to the perpendicular of the axis of rotation. As a result, the path of the tape is generally helical, producing a diagonal line of recorded signal or video information.

Typically, there is sufficient recorded information on each of the diagonal lines to produce one entire field or 262½ horizontal lines of video information. The switching between the pair of magnetic heads typically employed in such recording systems occurs near the end of each diagonal line of recorded material just before the occurrence of the vertical synchronization signals. The switching point appears as a line distortion at the bottom of the displayed video picture on a television receiver. Such distortion may include horizontal misalignment of displayed information below the switching point in addition to a horizontal line of poor quality video information across the displayed picture at the switching point.

Each recorded diagonal line also includes a vertical blanking interval during which there is no video information for display but instead camera generated synchronization pulses are present and recorded. The vertical synchronization signals occurring near the beginning of the blanking interval are particularly critical because incorrect synchronization signals during this period adversely affects reproduction and locking of the displayed video signal. Thus, head switching occurring during the vertical synchronization signals can distort the entire video presentation by the television receiver. To avoid synchronization problems, the portable cameras are designed such that the head switching point is not positioned in the vertical blanking interval but instead is retained in the displayed video portion of the signal leading to the still objectional line of distortion.

It is desirable, therefore, to delete the line distortion which occurs in helical scan recorders of the type employed for recording video information from portable cameras to retain the advantages of a small and portable helical recording system but without interfering with vertical synchronization. One method proposed to achieve this goal is represented in my co-pending patent application entitled TELEVISION CAMERA AND BLANKING SYSTEM, filed on Nov. 14, 1977, Ser. No. 851,105 (now abandoned). In this system, each of the cameras are modified to include an electrical circuit for compressing the vertical blanking interval such that additional video or signal information is recorded and the portion of the video signal including the switching point is not subsequently displayed by the television receiver. Although this system effectively eliminates the objectional line distortion without affecting vertical synchronization, it requires modification of each of the cameras and many cameras can be used with each tape recorder.

SUMMARY OF THE INVENTION

The present invention achieves the goals of eliminating line distortion and maintaining proper vertical and horizontal synchronization of the displayed video signal at the television receiver reproducing the recorded information and requires only a single circuit which is used with the helical scan tape recorder which as a result can be used with a plurality of unmodified standard portable cameras or from a remote video source. It accomplishes this result by providing a delayed vertical synchronization generator at the recorder for delaying the vertical synchronization for five to seven horizontal lines after the beginning of the vertical blanking interval. Inasmuch as the switchover point always occurs approximately three horizontal lines before the beginning of vertical synchronization, the switchover point will occur in the system of the present invention during vertical blanking and therefore not be displayed by the television receiver when the recorded information is played back.

The present invention and its various features, advantages, and objects can best be understood by reference to the following description thereof together with the drawings in which:

DETAILED DESCRIPTION OF THE PREFERRED EMBODIMENT

Figure 1:
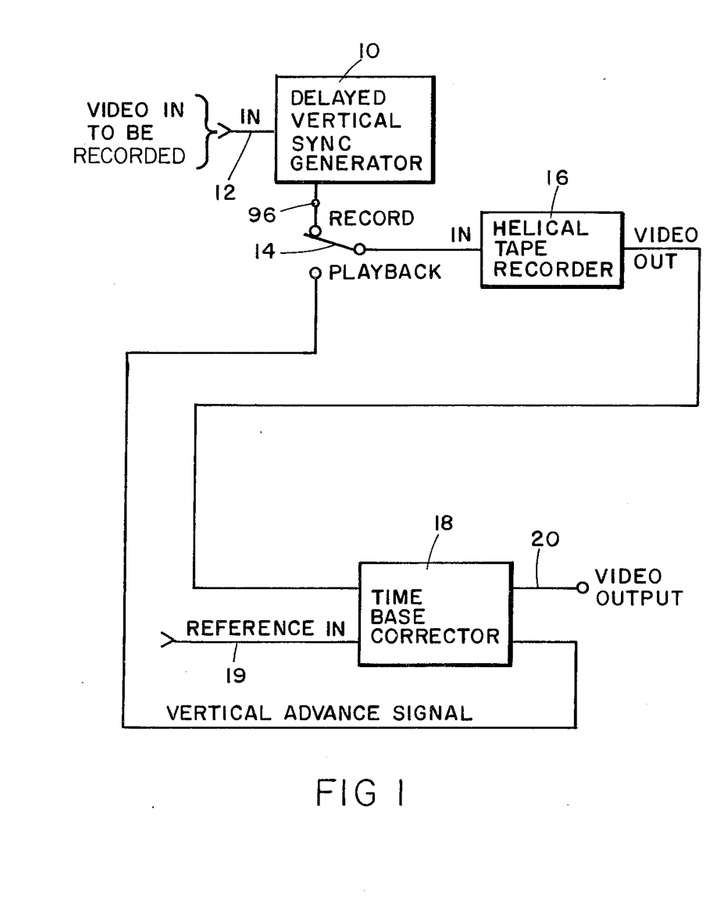
FIG. 1 is an electrical circuit diagram in block form of the present invention.

In FIG. 1, composite video signals from a portable television camera such as an RCA type TK-76 or a remote video source is applied to a delayed vertical sync generator 10 incorporating the present invention by means of an input conductor 12. The output signals from the delayed vertical sync generator comprises the video signal information together with the vertical and horizontal synchronization information contained in part in each vertical blanking interval between each field of a television frame. The vertical blanking interval is a period of approximately 21 horizontal lines including equalization pulses and vertical and horizontal sync pulses. The vertical synchronization signals at the output of generator 10 are delayed by approximately 5 to 7 H (H is a time period of one horizontal line, i.e., 63.5 microseconds). The modified video signals are then applied through a record-playback switch 14 when in the record position to a helical scan tape recorder 16. The recorder 16 can be a commercially available Sony type 2850A or its equivalent. Its operation is more fully described in the above identified copending application Ser. No. 851,105, the disclosure of which is incorporated herein by reference.

The system shown in FIG. 1 comprising elements 10 through 16 is portable and can be taken into the field for on-the-spot news gathering or coverage of events remote from the studio. When the information on tape used with the recorder 16, however, is played back at the studio, it is played through a time base corrector circuit 18 which receives studio reference synchronization signals from a studio synchronization generator by means of input conductor 19. For playback, the record-playback switch 14 is moved to the playback position whereby the time base corrector circuit applies vertical advance signals to the input of the tape recorder 16 and provides studio video output at an output conductor 20 for transmission along network lines or to the television transmitter itself. Time base corrector 18 stabilizes the time base of the relatively small helical tape recorder 16 and makes the video output in phase with the studio synchronization thereby eliminating jitter of the video signal transmitted from the studio.

Figure 6A:
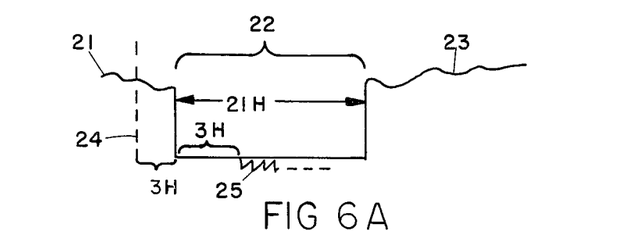
FIG. 6A is an electrical waveform diagram showing the vertical blanking interval signals of a standard television signal.
Figure 6B:
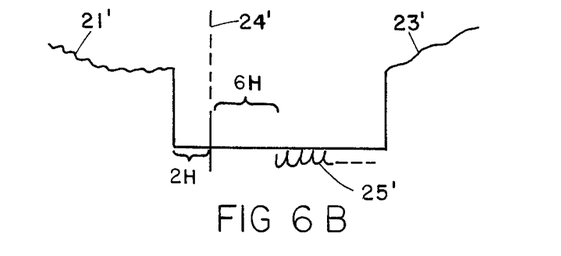
FIG. 6B is an electrical waveform diagram of the vertical blanking interval signals with the vertical synchronization signals delayed according to the present invention.

The effect of the delayed vertical sync generator 10 can best be understood by reference to FIG. 6A and 6B where in 6A a standard composite television signal is shown with the video information from a first field illustrated as portion 21 of the signal waveform. The vertical blanking interval is shown at 22 with the second field of video information occurring after the vertical blanking interval at portion 23 of the waveform diagram. The video tape recorder switchover point occurs approximately 3 H before the beginning of the vertical blanking interval and is indicated by the dotted line 24 in FIG. 6A. The vertical synchronization signals 25 occur 3 H after the initiation of the vertical blanking interval (i.e., after a 3 H equalization pulse interval).

Thus, in the prior art shown in FIG. 6A, the switchover point occurs during the displayed video information near the end of each field and causes line distortion. With the delayed sync generator 10, however, the video signals applied to the input of helical tape recorder 16 have vertical sync signals 25' (FIG. 6B) delayed from 5 to 7 H which makes the vertical sync signal start 8 to 10 H after the beginning of the vertical blanking interval. The switchover point which always occurs due to the tape machine design at about 6 H before the vertical sync signals is thus shifted into the vertical blanking interval and occurs at dashed line 24' between the beginning of vertical blanking and the beginning of the vertical synchronization signals 25'. The video signals of the first and second fields are indicated in FIG. 6B as 21' and 23', respectively. Thus, by shifting the vertical synchronization signals from the camera, the recorder's switchover point will occur during the vertical blanking interval and not cause line distortion or affect vertical synchronization. The circuits constituting the delayed vertical synchronization generator are now described in greater detail with reference to FIGS. 2 through 5.

Figure 2:
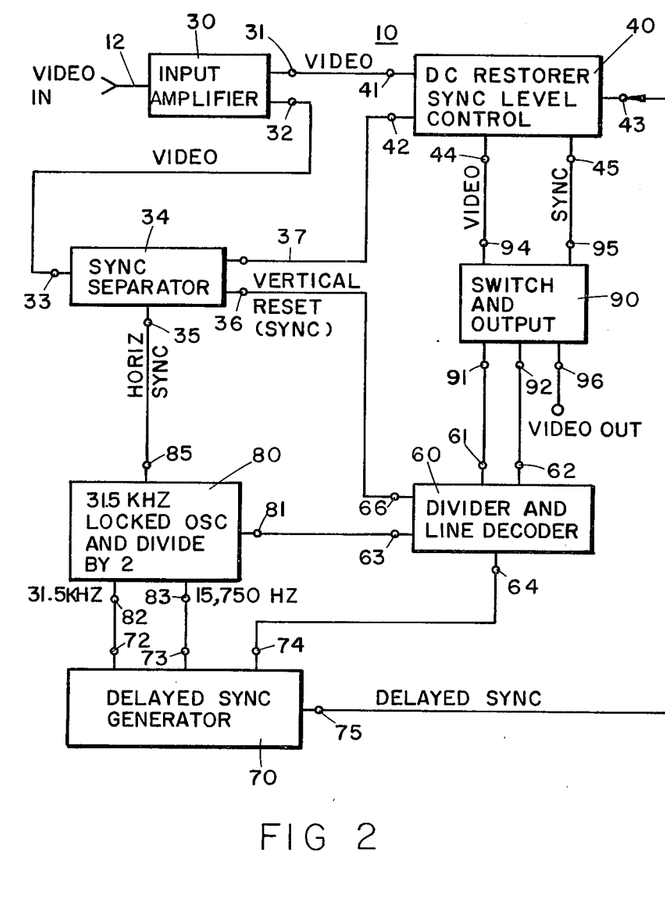
FIG. 2 is a detailed electrical circuit diagram in block form of the present invention.

Referring initially to FIG. 2, there is shown the delayed vertical sync generator 10 which includes an input amplifier 30 to which is coupled the 75 ohm input video cable 12. The input amplifier 30 is of conventional design and has a gain of two to provide for cable loss and the matching of output impedance. Amplifier 30 includes a first output 31 for applying video signals to an input 41 of a DC restorer circuit 40 and a second output 32 coupled to the input 33 of a sync separator 34 for providing video signals to the sync separator. Sync separator 34 is of conventional design and has a horizontal synchronization pulse output 35 coupled to an input 85 of a phase locked oscillator 80, a vertical reset pulse output 36 coupled to input 66 of a divider and line decoder circuit 60, and a triggering pulse output 37 coupled to input 42 of DC restorer circuit 40. The sync separator thus includes an integrator circuit for separating vertical and horizontal synchronization signals and a pair of multivibrators for providing a pulse at output 37 at the trailing edge of each horizontal sync pulse and a reset pulse on output 36 which occurs at the leading edge of the beginning of vertical synchronization pulses for resetting the divider and line decoder circuit 60.

The DC restorer circuit 40 is employed to assure that the added synchronization signals are at the same DC level as the incoming synchronization signals. To assure this, incoming synchronization signals from input conductor 31 are sampled when the restorer 40 is triggered by triggering pulse applied to input 42. The delayed synchronization signals are applied to input 43 from output 75 of a delayed sync generator 70.

The 15.75 KHz and 31.5 KHz signals employed to trigger the delayed sync generator 70 and the divider and line decoder 60 are generated by a conventional 31.5 KHz phase locked oscillator 80 which is locked to the frequency of the horizontal sync signals by means of the sync pulses applied to its input 85. Oscillator 80 thus applies 31.5 KHz signals from an output terminal 81 to an input 63 of the divider and line decoder 60. The same frequency signals are applied from output 82 to input 72 of the delayed sync generator 70 and 15.75 KHz signals at output 83 are applied to input 73 of delayed sync generator 70. The synthesized sync signals from the delayed sync generator 70 are applied to input 43 of the DC restorer circuit 40 through output terminal 75. The DC restorer then applies camera video and synchronization signals at output terminal 44 to input terminal 94 of a switch and output circuit 90 and synthesized sync signals at output 45 to input 95 of circuit 90 for inserting the synchronization signals during the 21 H vertical blanking interval. The divider and line decoder circuit 60 counts 31.5 KHz pulses to determine the leading edge of each vertical blanking interval and applies signals at output terminals 61 and 62 to input terminals 91 and 92 of the switch and output circuit 90 to insert synchronization signals from output terminal 45 of the DC restorer 40 into the video from output terminal 44 to provide a composite video output signal at output terminal 96 of the switch and output circuit 90. Thus, the new synchronization signal information is inserted by blanking out the incoming synchronization signals at the switch and output circuit 90 and inserting the delayed synchronization signals during the vertical blanking interval. The DC restorer circuit 40, the switch and output circuit 90, and the divider and line decoder 60 and delayed sync generator circuit 70 are described in greater detail with reference to FIGS. 3 through 5 where in FIG. 3, the DC restorer and sync level control 40 is first described.

Figure 3:
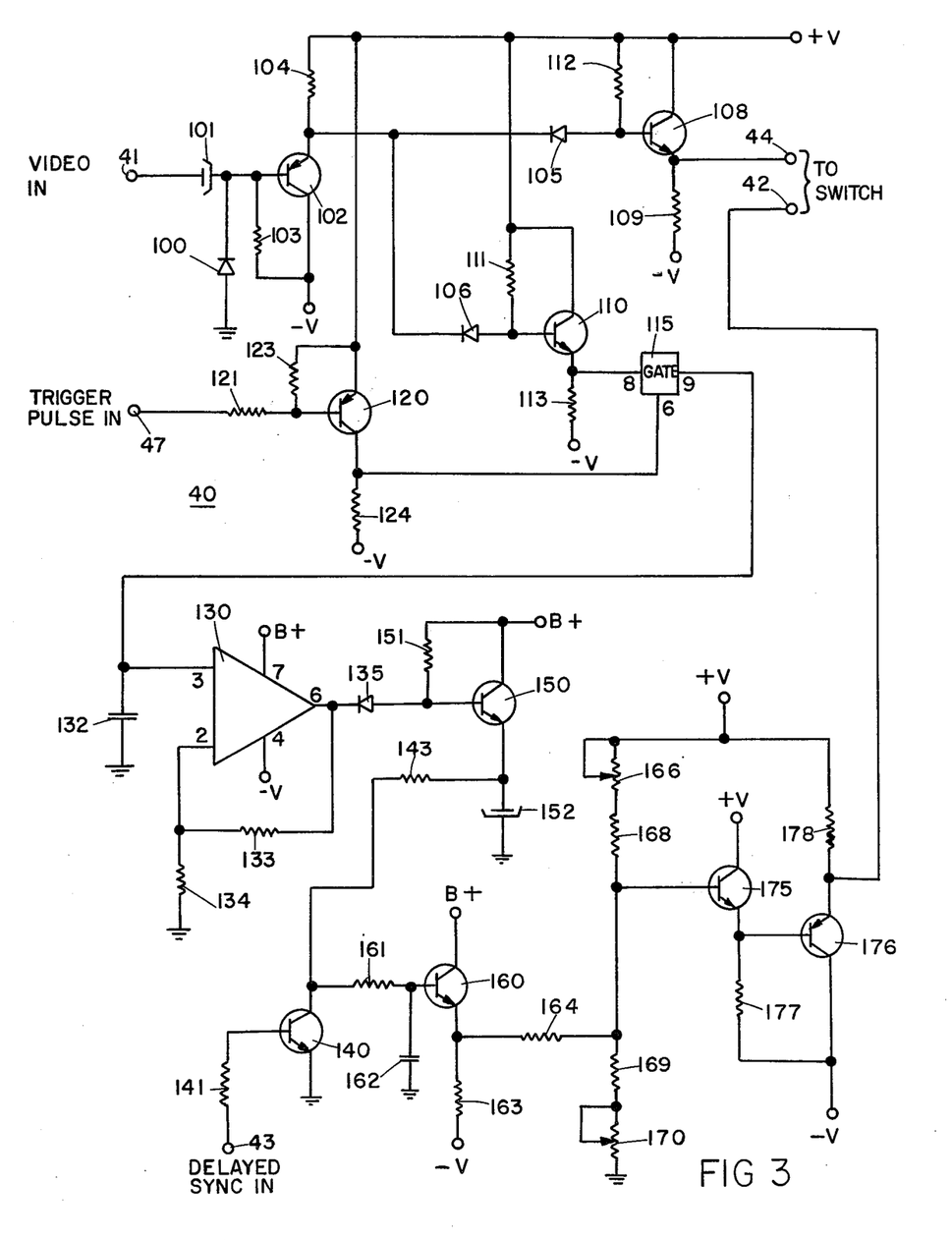
FIG. 3 is an electrical circuit diagram in schematic form of a portion of the circuitry shown in FIG. 2.

The incoming video signals at terminal 41 of circuit 40 are applied to a clamping diode 100 by a capacitor 101 and to the base of PNP transistor 102. The collector of transistor 102 is coupled to a −V supply and a resistor 103 is coupled between the base and collector. This input circuit assures that the sync tips are clamped to ground potential. Diodes 105 and 106 have their cathodes coupled to the emitter of transistor 102 which is coupled to the +V supply through a resistor 104. Diodes 105 and 106 assure that the DC level of the video signal is the same as the DC level of the sync signal at output terminal 44. Diode 105 has its anode coupled to the base of NPN transistor 108 having its collector coupled to the +V supply and its emitter coupled to the −V supply through a resistor 109. The emitter output of transistor 108 is coupled to output terminal 44. NPN transistor 110 has its base coupled to the anode of diode 106 and its collector terminal coupled to the +V supply. Base bias resistors 111 and 112 couple the base of transistor 110, 108, respectively, to the +V supply for biasing these transistors. The emitter of transistor 110 is coupled to the −V supply through resistor 113 and to an input terminal 8 of gate circuit 115.

Gate circuit 115 is periodically triggered at the horizontal sync pulse frequency by triggering pulses applied to input terminal 47. The gate control terminal 6 is coupled to terminal 47 by means of a transistor amplifier comprising PNP transistor 120 having a base input resistor 121 coupling input terminal 47 to the base of this transistor. The emitter of transistor 120 is coupled to the +V supply and an emitter-to-base resistor 123 biases the transistor. The collector of transistor 120 is coupled to the −V supply through a resistor 124 and to the terminal 6 of gate 115. Thus, the pulse input to gate 115 is at the same level as the video level output at terminal 44 due to the symmetry of circuits including transistors 108 and 110. The output signal at pin 9 of gate 115 is a pulse representing a momentary sample point occurring right after each horizontal synchronization pulse during each field of the video display and is at the DC level of the camera's synchronization pulses.

The output 9 of gate 115 is coupled to the input of an operational amplifier 130 by means of a capacitor 132 which charges to and is maintained at the camera's DC output level. Amplifier 130 is coupled to the +V and −V supplies and includes a feedback resistor 133 between output pin 6 and input terminal 2, the latter named terminal also being coupled to ground by means of a resistor 134. Amplifier 130 has a gain of approximately 4 and its output at terminal 6 is employed to control the level of the signal at the collector terminal of NPN transistor 140 having its base terminal coupled to the delayed sync input terminal 43 by means of a resistor 141. The emitter of transistor 140 is coupled to ground and its collector is coupled to a B+ supply through NPN transistor 150 having its emitter coupled to the collector of transistor 140 through resistor 143. In the preferred embodiment the B+ supply was a +12 VDC supply while the +V and −V supplies were +5 VDC and −5 VDC, respectively. The base of transistor 150 is coupled to the output of amplifier 130 by a diode 135 and a base-to-collector resistor 151 biases transistor 150. A capacitor 152 is coupled from the collector of transistor 150 to ground.

The collector terminal of transistor 140 is coupled to the base of NPN transistor 160 by means of resistor 161 which base is also coupled to ground by means of a capacitor 162. The collector of transistor 160 is coupled to the B+ supply and its emitter is coupled to the −V supply by means of a resistor 163. The emitter output of transistor 160 is coupled to a voltage dividing circuit by means of resistor 164.

Figure 4:
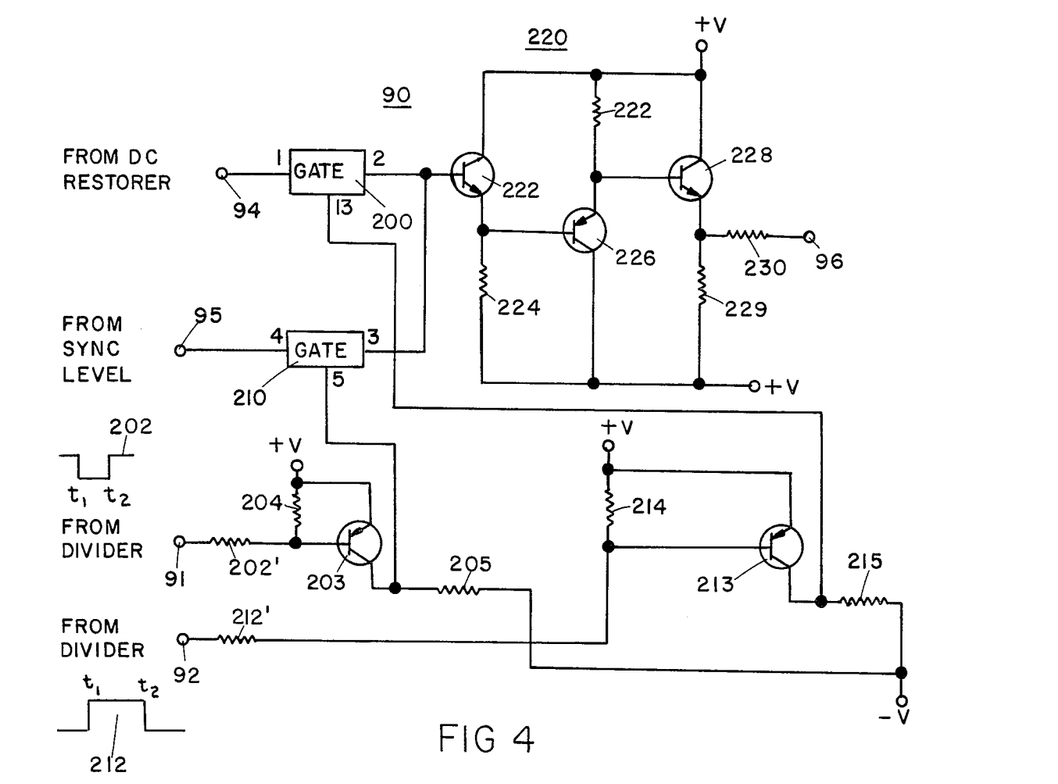
FIG. 4 is an electrical circuit diagram in schematic form of a portion of the circuitry shown in FIG. 2.

Thus, the output of amplifier 130 through transistor 150 controls the DC level of the delayed sync output at the collector of transistor 140 such that the DC level tracks with the incoming level of video sampled and applied to capacitor 132. The buffer amplifier 160 isolates the delayed synchronization signals from input 43 now having its DC level adjusted and applies them to an adjustable voltage divider. The voltage divider includes potentiometer 166, serially coupled resistors 168 and 169, and a final serially coupled potentiometer 170 extending between the +V supply to ground. The resistor 164 has its junction remote from the emitter terminal of transistor 160 coupled between resistors 168 and 169. Resistor 170 serves to adjust the top level of the delayed synchronization signals while resistor 166 shifts both the top and bottom levels of the synchronization signals. The resultant DC matched delayed synchronization signals are applied through a zero DC offset amplifier comprising NPN transistor 175 and PNP transistor 176 including biasing resistors 177 and 178 coupled as shown in the diagram for further isolation. The emitter terminal of transistor 176 is then coupled to output terminal 42 to provide the DC restored delayed synchronization signals to the switching circuit 90. The camera video with the standard synchronization signals are applied to switch circuit through output terminal 44. Having described the unique DC restorer and sync level control circuit by which a two microsecond sample of the incoming sync level from the camera is employed for matching the DC level of synthesized delayed sync signals, the description of the switching circuit 90 in conjunction with FIG. 4 is now presented.

The function of the switch and output circuit 90 is to insert the delayed synchronization signals in the vertical blanking interval and delete the standard synchronization signals from the video input terminal 94. This is accomplished by the utilization of a first gate circuit 200 and a second gate circuit 210 which are selectively triggered to pass video and the delayed vertical synchronization signals to a three stage output amplifier 220. Gates 200 and 210 are controlled by signals applied to input terminals 91 and 92 from the divider line decoder 60 which provides the timing information for proper deletion of the standard vertical synchronization signals and the insertion of the delayed vertical synchronization signals. The timing pulse applied to terminals 91 and 92 are generated as described below in conjunction with FIG. 5. It is sufficient for the description of circuit 90 of FIG. 4 to appreciate that at a time $t_1$ to $t_2$ a negative going signal 202 is applied to the base of PNP transistor 203 by input resistor 202'. Transistor 202 has its emitter coupled to the $+V$ supply and an emitter-to-base biasing resistor 204. The collector of transistor 203 is returned to a $-V$ supply by resistor 205 and its collector is also coupled to control input terminal 5 of gate 210. Similarly, a positive going control input pulse 212 from $t_1$ to $t_2$ is applied to the base of PNP transistor 213 by means of an input resistor 212'. The emitter of transistor 213 is coupled to the $+V$ supply and an emitter-to-base biasing resistor 214 is provided for biasing the transistor. The collector of transistor 213 is coupled to the $-V$ supply by means of a resistor 215 and is coupled to the control input terminal 13 of gate 200.

Time $t_1$ corresponds to the beginning of the normal vertical blanking signal from the camera and pulses 212 causes transistor 213 to switch off thereby switching off gate 200 to block out the incoming standard vertical synchronization signals. At the same time ($t_1$) pulse 202 causes gate 210 to be rendered conductive passing the new delayed synchronization signals which have the vertical synchronization signals delayed by 5 to 8 H to the input of amplifier 220. Thus, the delayed synchronization signals from input terminal 95 are applied to the output amplifier through gate 210. At time $t_2$ which occurs 16 H after the time $t_1$, input signals 202 and 212 reverse polarity reversing the conduction state of gates 200 and 210 such that gate 200 is now conductive and gate 210 is nonconductive to again apply the normal composite video signals from the camera to the input of amplifier 220.

Amplifier 220 includes an input NPN transistor 222 having its collector coupled to the $+V$ supply and its emitter coupled to the $-V$ supply through emitter resistor 224. The emitter follower stage including transistor 222 is coupled to the base of PNP transistor 226 having its collector coupled to the $-V$ supply and its emitter coupled to the $+V$ supply through resistor 227. The emitter of transistor 226 is coupled to the base of a second emitter follower transistor amplifier including NPN transistor 228 having its collector coupled to the $+V$ supply and its emitter coupled to the $-V$ supply through resistor 229. An output resistor 230 couples the emitter of transistor 228 to the output terminal 96 providing the video output signals at terminal 96 with the delayed vertical synchronization signals inserted during the vertical blanking interval. These signals are then applied to the record-playback switch 14 shown in FIG. 1.

Figure 5:
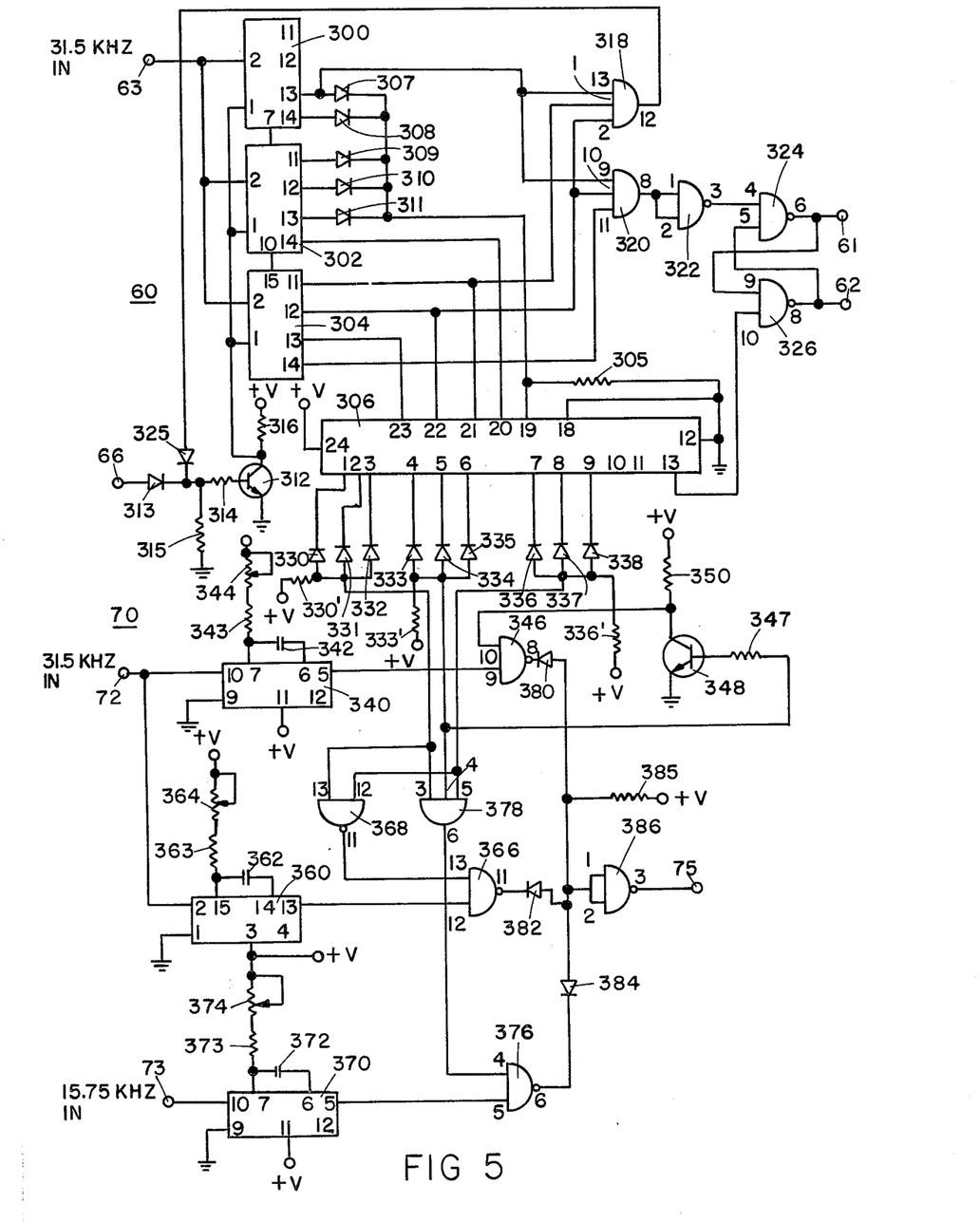
FIG. 5 is an electrical circuit diagram in schematic form of a portion of the circuitry shown in FIG. 2.

The timing signals 202 and 212 applied to the switch and output circuit 90 on input terminals 91 and 92 thereof as well as the synthesized delayed vertical sync and normal horizontal sync and equalization pulses are generated by the circuitry shown in FIG. 5. In this FIG. 5, the 31.5 KHz signals from the phase locked oscillator 80 are applied to input terminals 63 and 72. Input terminal 63 is coupled to three integrated circuit divide-by-16 counters type 74163 identified by reference numerals 300, 302, and 304 coupled as shown in the FIG. 5. with the commercially used pin numbers identified in the FIG. 5. A commercially available type 74154 integrated circuit binary to decimal decoder 306 is coupled to circuits 300, 302, and 304 as shown. A resistor 305 is coupled from pin 19 to ground pin 18 of decoder circuit 306. The control outputs of circuits 300, 302, and 304 are coupled by diodes 307 through 311 to selectively enable circuit 306 during lines 0 through 15 of each vertical blanking interval. Counters 300 through 304 are reset by the leading edge of the normal vertical synchronization signal by a signal applied to input terminal 66 which is coupled to the base terminal of NPN transistor 312 by means of a steering diode 313 and input resistor 314. A resistor 315 is coupled from the junction of diode 313 and resistor 314 to ground. The collector of transistor 312 is coupled to the $+V$ supply by resistor 316 and to reset terminal 1 of the counters. The output of counters 300, 302, and 304 are also coupled to AND gates 318 and 320 which are a part of an integrated circuit type 7411. Gate 320 has an output at the start of vertical blanking which is coupled as shown in FIG. 5 to inverter 322 and flips the flip-flop formed by NAND gates 324 and 326. The flip-flop is flipped back by the 15th output of decoder 306 which provides a 16 H wide pulse output at output terminals 61 and 62 of the circuit. The output of AND gate 318 is coupled to the junction of resistor 314 and diode 313 by means of diode 325 to reset the counts if the vertical signal from terminal 66 does not.

Thus, the dividers and $T^2L$ logic develops the signals 202 and 212 shown in FIG. 4 for insertion of the synthesized delayed vertical synchronization pulses.

The amount of delay of the new vertical sync pulses is determined by the decoder circuit 306 having pins 1 through 9 matrixed to the $T^2L$ logic circuit remaining to be described in FIG. 5 to provide a 5 H delay of the vertical synchronization pulses. For a 6 H delay, outputs 2 through 10 would be employed while for a 7 H delay, outputs 3 through 11 would be employed. The outputs 1 through 9 are indicated collectively as terminal 64 in FIG. 2 and is coupled to collective input terminal 74 of the delayed vertical sync generator 70 by means of diodes 330 through 338. Circuit 70 also receives a 31.5 KHz input signal at input terminal 72 and a 15.75 KHz signal at input terminal 73 to develop the delayed vertical sync pulses, the equalization pulses, and the horizontal sync pulses for insertion during each vertical blanking interval.

A one shot multivibrator 340 develops the vertical synchronization pulses having a pulse width of 27.3 microseconds output pulses in response to the 31.5 KHz input signals selected by the RC network including capacitor 342, resistor 343, and potentiometer 344 coupled as shown in FIG. 5. Integrated circuit 340 comprises one half of a type 74221 integrated circuit chip providing at output pin 5 the vertical synchronization pulses applied to one input of NAND gate 346. Gate 346 is enabled by an output signal from NPN transistor 348 having its emitter terminal grounded and its base terminal coupled to the anode of diodes 333, 334, and 335 by means of a base drive resistor 347. The collector terminal of transistor 348 is coupled to the $+V$ supply through resistor 350.

Equalization pulses are developed by one shot multivibrator 360 which is also one half of a type 74221 integrated circuit developing 2.4 microsecond output pulses in response to 31.5 KHz input signals by the RC network comprising capacitor 362, resistor 363, and potentiometer 364 coupled as shown in the Figure. The output of the circuit 360 is applied to one input of NAND gate 366 having its remaining input coupled to the output of NAND gate 368. NAND gate 368, in turn, has one input coupled to the anodes of diodes 330 through 332 and its remaining input coupled to the anode junction of diodes 336 through 338 to provide proper timing of the equalization pulse in the vertical blanking synchronization pulse train.

The horizontal synchronization pulses are developed by one shot multivibrator 370 in response to the 15.75 KHz signals applied in input terminal 73. Circuit 370 also is one half of an integrated circuit model 74221 having a 4.8 microsecond horizontal synchronization pulse width output occurring at the horizontal synchronization pulse frequence by virtue of the RC network including capacitor 372, resistor 373, and potentiometer 374 coupled as shown in the Figure. The horizontal synchronization pulse output from one shot multivibrator 370 is applied to one input of NAND gate 376 having its remaining input terminal coupled to the output terminal of NAND gate 378. One input of AND gate 378 is coupled to the anode junction of diodes 330 through 332, another input of AND gate 378 is coupled to the anode junction of diodes 333 through 335 and the final input of gate 378 is coupled to the anode junction of diodes 336 through 338. Each group of diodes is coupled to the +V supply by means of a resistor 330', 333', and 336' respectively.

The vertical synchronization signals, equalization signals, and the horizontal synchronization signals are matrixed by diodes 380, 382, and 384 having their cathodes coupled to gates 346, 366, and 376, respectively, and their anodes commonly coupled and in turn coupled to the +V supply by means of a resistor 385. The anodes of these diodes are also coupled to an inverter 386 and to output terminal 75 to provide the composite synchronization signals with the vertical sync signals delayed by 5 H at output terminal 75. The delayed output signals are applied as noted above to the input terminal 43 of the DC restorer circuit 40 and subsequently to input terminal 95 of the switch and output circuit 90 to provide the composite video output signal at terminal 96. The composite video signals include the picture or video signal information together with the vertical blanking synchronization information with the vertical synchronization pulses delayed as shown in FIG. 6B.

It will become apparent to those skilled in the art that various modifications to the preferred embodiment of the invention described and disclosed herein can be made without departing from the spirit or scope of the invention as defined by the appended claims.

The embodiments of the invention in which an exclusive property or privilege is claimed are defined as follows.

1. A system for recording composite video signals using a helical tape recorder which has a head switchover point occurring before the vertical sync signals after vertical blanking starts to eliminate line distortion caused by the head switching comprising:
    input means for receiving composite video signals from a camera;
    output means for applying video and delayed synchronization signals to a multiple head helical tape recorder in which the head switchover point occurs a predetermined time prior to the vertical synchronization signals; and
    a delayed vertical synchronization signal circuit coupled between said input and output means for providing delayed vertical synchronization signals during each vertical blanking interval to position the head switchover point in the vertical blanking interval before the vertical synchronization signals.

2. The system as defined in claim 1 wherein said delayed vertical synchronization signal circuit includes a delayed vertical synchronization signal generator and switching circuit means coupled between said input means and said output means and to said delayed vertical synchronization signal generator for deleting the standard vertical synchronization signals and inserting delayed vertical synchronization signals during the vertical blanking interval.

3. The system as defined in claim 2 wherein said input means includes a sync separator circuit having an input terminal for receiving composite video signals, said sync separator having an output terminal coupled to said switching circuit means for providing horizontal and vertical sync signals to said delayed vertical synchronization signal generator.

4. The system as defined in claim 3 wherein said delayed vertical synchronization signal generator includes a phase locked oscillator coupled to said sync separator for providing reference frequency output signals, a divider and decoder circuit coupled to said phase locked oscillator; a delayed sync generator coupled to said divider and decoder and to said phase locked oscillator for providing synchronization signals including delayed vertical sync signals at an output terminal; and said switching circuit means comprises a switch and output circuit coupled to said input means, to said delayed sync generator and to said divider and decoder circuit for deleting sync signals from composite video at said input means and inserting sync signals from said delayed sync generator.

5. The system as defined in claim 4 and further including a DC restorer circuit coupled from said input circuit means and said sync separator to said switch and output circuit.

6. The system as defined in claim 5 wherein said DC restorer circuit is further coupled between said delayed sync generator and said switch and output circuit and includes means for sampling the DC level of the incoming composite video signals and for adjusting the DC level of said sync signals from said delayed sync generator to match that of the sampled video signals.

7. The system as defined in claims 1 or 2 wherein said delayed vertical sync signals are delayed at least 5 H.

8. The system as defined in claims 1 or 2 wherein said delayed vertical sync signals are delayed from 5 H to 7 H.

9. A method of eliminating line distortion caused in the displayed video playback from a helical tape recorder due to head switching which occurs at a predetermined time prior to the vertical synchronization signals comprising the steps of:
    detecting the vertical blanking interval of composite video signals to be recorded;
    stripping the sync signals occurring during the vertical blanking interval from the composite video signals;
    generating sync signals including delayed vertical sync signals; and inserting the generated sync signals into the detected vertical blanking interval whereby the head switchover point occurs during the vertical blanking interval before the delayed vertical sync signals.

10. The method as defined in claim 9 wherein said generating step generates vertical sync signals delayed from 5 to 7 H.

11. For use with a video recording system in which a multiple head recorder is employed and in which the head switchover point occurs a predetermined time prior to the beginning of the vertical synchronization signals, a system comprising:

means for generating delayed vertical synchronization signals and for inserting the delayed vertical synchronization signals in place of the incoming vertical synchronization signals of the video signal source; and means for applying the resultant video and delayed vertical synchronization signals to a helical head recording apparatus forming diagonal lines of recorded video information on a magnetic tape, so that each of the diagonal lines contains sufficient recorded video information to produce one complete field of a television display without displaying the playback position at which one magnetic head switches to another magnetic head to eliminate line distortion otherwise caused by the head switching.

12. The system as defined in claim 11 wherein said generating means includes positioning means for adjusting the relative starting positions of the vertical synchronization and vertical blanking signals so that said vertical synchronization signal starts after said vertical blanking signal thereby shifting the playback position at which one magnetic head switches to another magnetic head into the vertical blanking period and thus out of the video display.

13. The system as defined in claim 12 wherein said positioning means delays the start of the vertical synchronization signals for at least 5 H.

14. The system as defined in claim 13 wherein said positioning means includes an oscillator and timing circuit for providing timing signals for controlling the insertion of delayed vertical synchronization signals into the video signal.

15. The system as defined in claim 14 wherein said positioning means further includes switching means for selectively coupling said generating means between an input and an output of said positioning means, said switching means having control input terminal means coupled to said timing circuit for receiving control signals therefrom.

16. The system as defined in claim 15 and further including a synchronization signal separator having an input coupled for receiving video signals and an output coupled to the input of said oscillator to control the frequency of said oscillator.

* * * * *